United States Patent
Story

(10) Patent No.: US 6,934,290 B2
(45) Date of Patent: Aug. 23, 2005

(54) DETERMINING CONNECTION INFORMATION FOR A NETWORK

(75) Inventor: Roger E. Story, Bridgewater, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 532 days.

(21) Appl. No.: 10/057,462

(22) Filed: Jan. 25, 2002

(65) Prior Publication Data

US 2003/0142677 A1 Jul. 31, 2003

(51) Int. Cl.$^7$ .................. H04L 12/28; H04L 12/56
(52) U.S. Cl. .................. 370/395.1; 370/401
(58) Field of Search .................. 370/395.1, 392, 370/389, 395.3, 395.31, 355, 401, 395.41, 475, 352, 395.52, 395.53

(56) References Cited

U.S. PATENT DOCUMENTS

| | | | | |
|---|---|---|---|---|
| 5,793,362 A | * | 8/1998 | Matthews et al. | 709/224 |
| 6,442,144 B1 | * | 8/2002 | Hansen et al. | 370/255 |
| 6,697,361 B2 | * | 2/2004 | Fredette et al. | 370/389 |
| 6,760,332 B1 | * | 7/2004 | Vladescu et al. | 370/395.1 |
| 6,765,908 B1 | * | 7/2004 | Chen | 370/392 |

* cited by examiner

*Primary Examiner*—Chi Pham
*Assistant Examiner*—Alexander O. Boakye
(74) *Attorney, Agent, or Firm*—Joseph Giordano; James W. Falk

(57) ABSTRACT

Methods and systems are provided for determining connection information for terminations and ports in a network. In accordance with an embodiment, to determine connection information for a first port that includes a first set of terminations and for a second port that includes a second set of terminations, information, such as path label information, bandwidth information, and traffic description information, for the first and second set of terminations may be determined. Based on a comparison of such information, it may be determined whether the first port is connected to the second port.

2 Claims, 4 Drawing Sheets

DETERMINING CONNECTION INFORMATION FOR A NETWORK

BACKGROUND OF THE INVENTION

1. Field of the Invention

The present invention relates generally to determining information about a network and, more particularly, to a system, method, and article of manufacture for determining connection information for ports and terminations in a network.

2. Background Information

Over the years, all types of networks, including connection oriented networks, such as asynchronous transport mode (ATM) and multi-protocol label switching (MPLS) networks, and connectionless networks, such as Internet protocol (IP) networks, have grown in size and complexity. Each node in such networks may include one or more network elements, such as a switch, with one or more ports. Each port in turn may include one or more terminations. A termination may include a logical subset of transmissions terminating at a port, such an ATM virtual channel termination.

Network providers and their customers generally wish to obtain information about a network for several reasons, such as ensuring level of service, troubleshooting network problems, and general network planning. The information may include, for example, connection information for terminations and ports in the network. Connection information for a termination may include information about some other termination to which the termination is connected over the network and about the port that includes this other termination. A termination may be logically connected to some other termination. Connection information for a port may include information about some other port to which the port is connected over the network and about the node that includes this other port. A port may be physically connected to some other port.

Generally, one may be able to automatically determine some information about a network through an information source, such as a management information base (MIB) or a database. An information source may include information about a network in a generic or a proprietary format. Moreover, an information source, such as MIB, may be located in a network element and/or a computer running a software program, such as an element management system (EMS). One may use a computer and EMS to query the information source and obtain certain information about the node, such as the number of ports on the node.

Known systems and methods, however, cannot determine connection information for terminations and ports. One reason for this shortcoming is that the information source may not store or provide the connection information. Another reason is that even if the information source provides the connection information, the connection information may not reside in the information source. Still another reason is that the connection information may reside in non-standard information sources and may require expensive application specific software interfaces and methods to obtain the connection information from these non-standard information sources.

SUMMARY OF A FEW ASPECTS OF THE INVENTION

To address the above and other problems of the prior art, methods and systems are provided for determining connection information in a network. For example, to determine connection information for a first port that includes a first set of terminations and a second port that includes a second set of terminations in a network, such methods and systems may determine information about the first and second set of terminations. This information may be compared, and based on the comparison, it may be determined whether the first port is connected to the second port.

If it is determined that the first port is connected to the second port, then the connection information for the first port may include information identifying the second port, and the connection information for the second port may include information identifying the first port. The connection information may be stored in a database residing in the network or in some other network.

Both the foregoing and the following description are exemplary and explanatory and are intended to provide further explanation of the claimed invention as opposed to limiting it in any manner.

BRIEF DESCRIPTION OF THE DRAWINGS

The accompanying drawings are incorporated in and constitute a part of this specification, and together with the description, explain the principles of the invention. In the drawings.

DETAILED DESCRIPTION

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

Methods and systems are provided for determining connection information for terminations and ports in a network. In one embodiment, a system may include a processor, such as a computer, connected to a network. The network may include a plurality of nodes, each including one or more network elements. Each network element may include one or more ports, each including one or more terminations.

The system may include a discovery process that determines the connection information for the terminations and the ports in the network. The discovery process may determine the type of network and then select a comparison method for determining the desired connection information for the terminations and ports. The discovery process may select the comparison method based on several factors, such as the type of the network, nodes, protocols in use in the network, equipment in the network, protocol features supported by the equipment, and the network provider.

After selecting the comparison method, the discovery process may identify for each termination the information required by the selected comparison method. For example, if the type of the network is an ATM network or a MPLS network, discovery process may identify that the selected comparison method requires for each termination, information such as path label information, bandwidth information, and traffic description information. Path label information for an ATM network may include a virtual path identifier (VPI) and a virtual channel identifier (VCI). Path label information for a MPLS network may include a MPLS path label identifier.

Next, the discovery process may obtain a list of nodes in the network, a list of ports on these nodes, and a list of terminations on these ports, and the previously identified termination information. Finally, based on the selected comparison method and the obtained termination information, discovery process may determine the connection information for the terminations and ports in the network.

Figure 1:
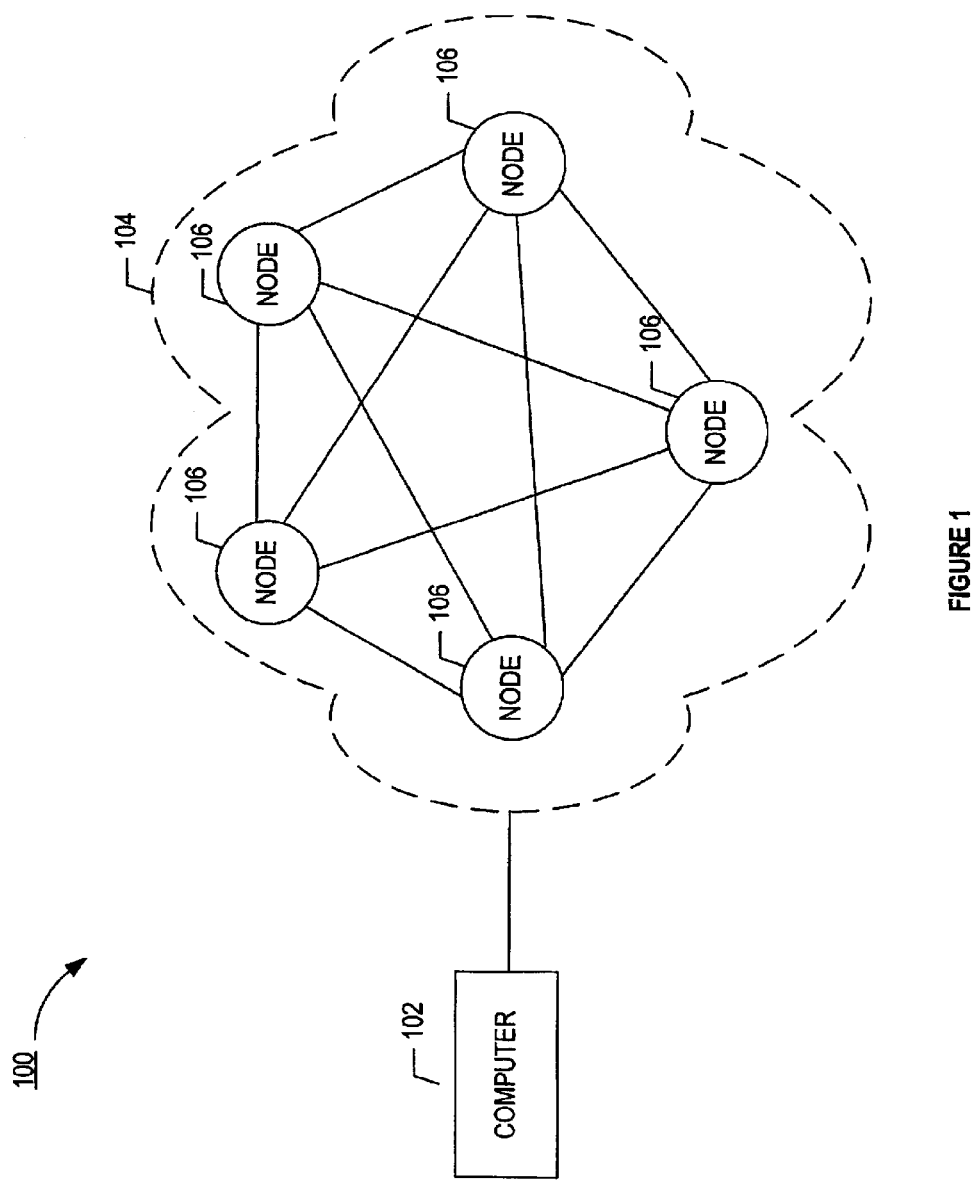
FIG. 1 is an exemplary block diagram of a system, in accordance with methods and systems consistent with the present invention.

FIG. 1 is an exemplary block diagram of a system 100, in accordance with methods and systems consistent with the present invention. System 100 may include a computer 102 connected to a network 104. Computer 102 may include a processor capable of communicating with network 104 and determining connection information for the terminations and ports in network 104.

Network 104, which includes one or more nodes 106, may include any type of network, such as an ATM network or an IP network. Each node 106 may include one or more network elements, such as a switch, router, gateway, and server, with one or more ports. Each port may include one or more terminations.

Other system and network configurations will be apparent to those skilled in the art and are also within the scope of the present invention. For example, system 100 may include an Element Management System (EMS) computer for providing to computer 102 information about nodes 106 in network 104. EMS computer may obtain such information about nodes 106 by querying information sources, such as MIBs corresponding to nodes 106.

Figure 2:
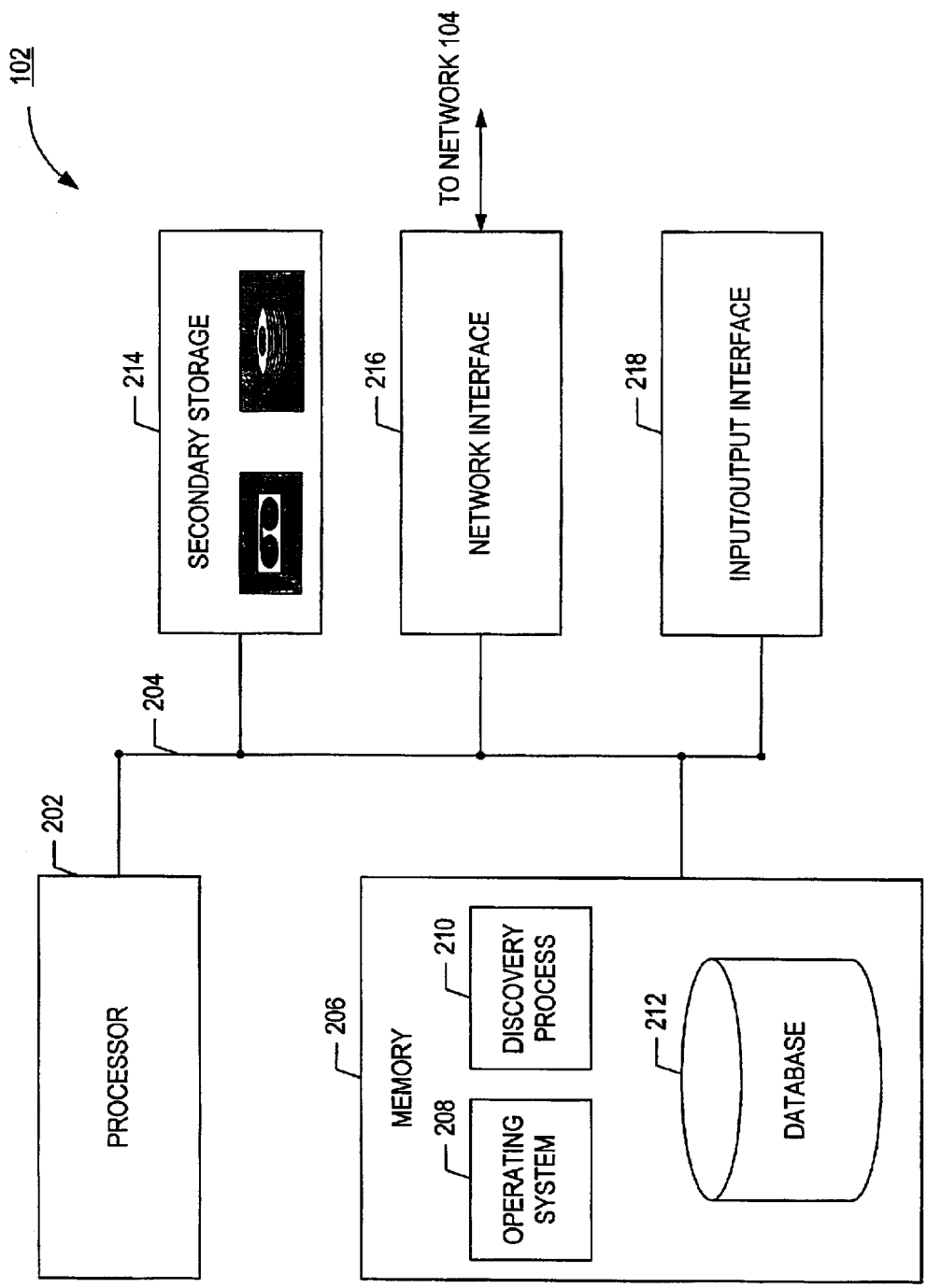
FIG. 2 is an exemplary block diagram of a processor, in accordance with methods and systems consistent with the present invention.

FIG. 2 is an exemplary block diagram of computer 102, in accordance with methods and systems consistent with the present invention. As shown, computer 102 may include a processor 202, which connects via a bus 204 to a memory 206, a secondary storage 214, a network interface 216, and an input/output interface 218.

Memory 206 may include an operating system 208, a discovery process 210, and a database 212. Operating system 208 may include, for example, the Windows 2000 operating system available from Microsoft Corporation. Discovery process 210 may include stored instructions in the form of software, which are executed by processor 202. Discovery process 210 may determine the connection information for the terminations and the ports in network 104. Database 212 may include any type of database, such as a relational database and may include several types of information, such as information about nodes and connection information for the terminations and the ports.

Secondary storage 214 may include a computer readable medium, such as a disk drive and a tape drive. From the tape drive, software and data may be loaded onto the disk drive, which can then be copied into memory 206. Similarly, software and data in memory 206 may be copied onto the disk drive, which can then be loaded onto the tape drive.

Network interface 216 may transmit and receive via network 104 messages, which may by processed by discovery process 210. Input/Output interface 218 may include, for example, a key board or a key pad and a display unit.

Figure 3:
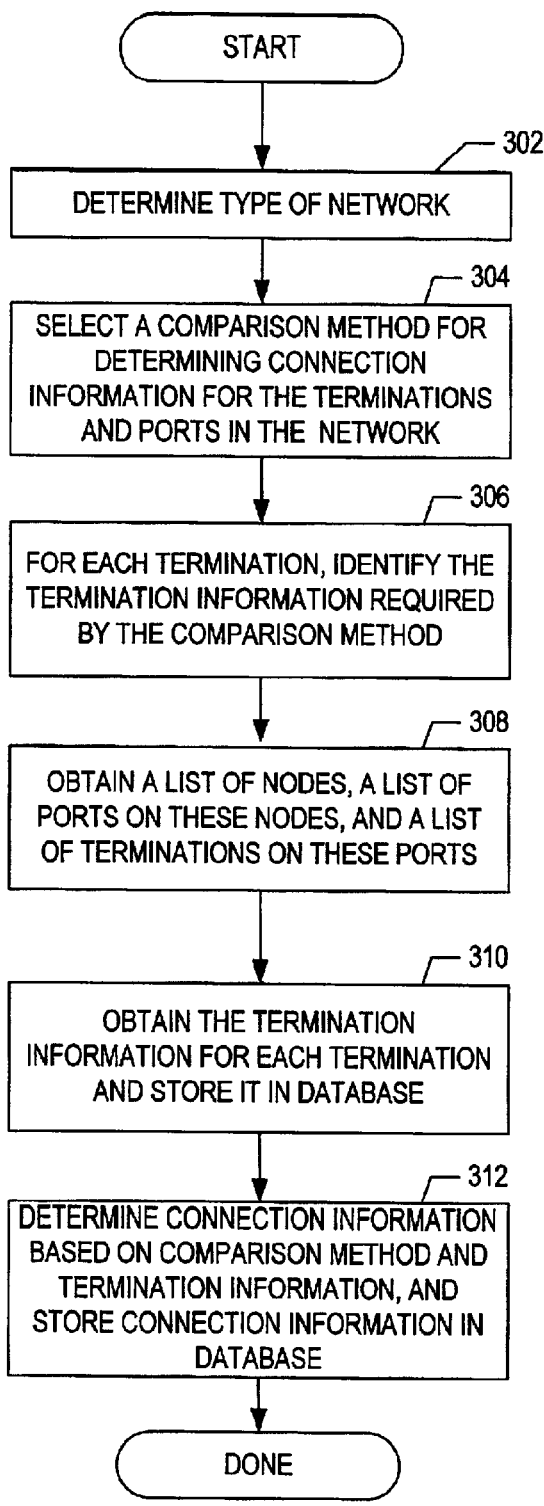
FIG. 3 is an exemplary flowchart illustrating the steps performed by a discovery process, in accordance with methods and systems consistent with the present invention.

FIG. 3 is an exemplary flowchart illustrating the steps performed by discovery process 210, in accordance with methods and systems consistent with the present invention. Discovery process 210 may first determine the type of network 104 (step 302). To determine the type of the network, discovery process 210 may query network 104 or may prompt the user of computer 102 to specify the type. Computer 102 may also automatically determine the type of network 104 by requesting such information from an EMS computer connected to system 100.

Once the type of network 104 has been determined, discovery process 210 may next select a comparison method for determining connection information for the terminations and ports in network 104 (step 304). The discovery process 201 may select the comparison method based on several factors, such as the type of network 104, nodes 106, protocols in use in the network, equipment in the network, protocol features supported by the equipment, and the network provider. Discovery process 210 may prompt the user of computer 102, such as network provider personnel, for a comparison method.

Discovery process 210 may next identify the termination information required by the selected comparison method for each termination on a port in network 104 (step 306). Termination information may include any information about a termination that may be used to match terminations and ports. To identify the termination information, discovery process 210 may examine the selected comparison method. For example, if network 104 is an ATM or a MPLS network, discovery process 210 may identify that the selected comparison method requires termination information, such as path label information, bandwidth information, and traffic description information. Alternatively, discovery process 210 may prompt the user of computer 102 to identify the required termination information.

Discovery process 210 may next obtain a list of nodes 106, a list of all the ports on the nodes 106, and a list of all terminations on these ports (step 308). This list may include the identification information for each node, its ports, and terminations on these ports. Discovery process 210 may obtain these lists in several ways. For example, a network provider may have previously obtained and stored these lists in database 212. Thus, discovery process 210 may obtain these lists from database 212. Alternatively, discovery process 210 may obtain these lists by querying network 104 or by requesting this information from an EMS computer. Querying network 104 may include querying the information sources, such as MIBs corresponding to nodes 106.

After obtaining the lists, discovery process 210 may obtain for each termination the termination information previously identified and store it in database 212 (step 310). Discovery process 210 may obtain the termination information in several ways. For example, discovery process 210 may obtain this information from database 212 in an embodiment where a network provider has obtained and stored this information in database 212. Alternatively, discovery process 210 may obtain the termination information by querying information sources, such as MIBs corresponding to nodes 106 or by requesting this information from an EMS computer.

Based on the selected comparison method and the obtained termination information, discovery process 210 may then determine the connection information for the terminations and ports in network 104 (step 312) and store the connection information in database 212 (step 312). After storing the connection information, discovery process 210 may terminate.

Figure 4:
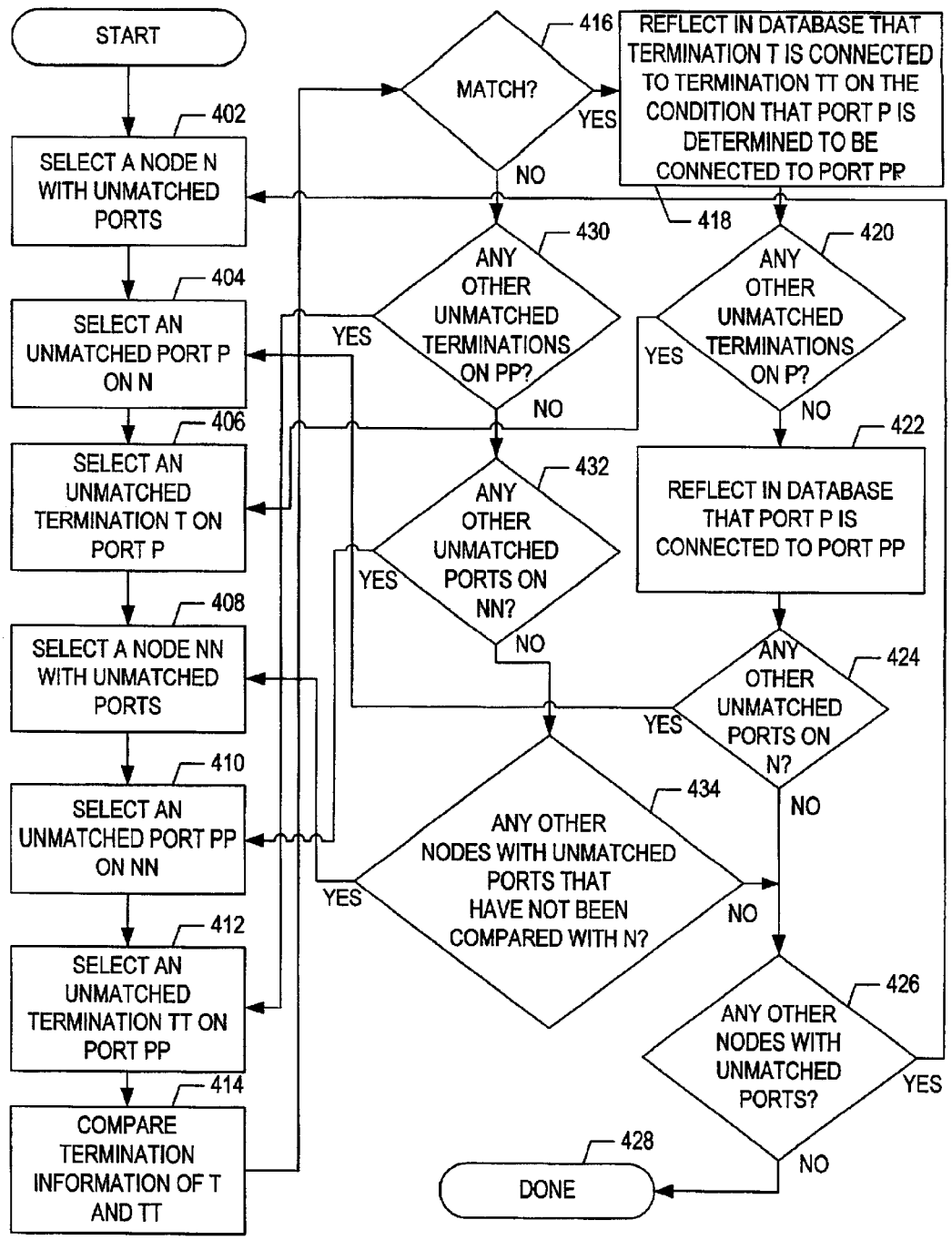
FIG. 4 is an exemplary flowchart illustrating a comparison method that a discovery process may select for determining connection information, in accordance with methods and systems consistent with the present invention.

FIG. 4 is an exemplary flowchart illustrating a comparison method that discovery process 210 may select for determining connection information for terminations and ports in network 104, in accordance with methods and systems consistent with the present invention. By using such a comparison method, discovery process 210 may determine connection information for terminations and ports in many types of networks, such as an ATM network.

For example, discovery process 210 may select a first node 106 ("N") that has unmatched ports (step 402). An unmatched port is a port for which discovery process does not have connection information. Discovery process may also select an unmatched port ("P") on node N, a termination ("T") on port P, a second node 106 ("NN") that also has unmatched ports, an unmatched port ("PP") on node NN, and a termination ("TT") on port PP (steps 404, 406, 408, 410, and 412). Discovery process 210 may make these selections using a variety of methods, such as querying database 212 to determine unmatched nodes, ports, or terminations.

Next, discovery process 210 may retrieve the termination information for terminations T and TT from database 212 and compare it with each other to determine if there is a match (step 414). The criteria for the comparison and match, i.e., how to compare the termination information for terminations T and TT and determine a match, may depend on the type of network and the selected comparison method. For example, if the type of network is an ATM or a MPLS network, the termination information may include path label information, bandwidth information, and traffic description information, and this information may be compared using a criteria, such as path label information and bandwidth having the same value for the terminations being compared; and traffic description being inbound traffic for one termination and outbound traffic for the other termination.

In addition, the termination information may be compared in a specific order. For example, discovery process 210 may compare the termination information in the order of path label information, bandwidth information, and traffic description. By specifying an order, discovery process 210 may avoid unnecessary comparisons, such as when path label information of two terminations does not match, discovery process 210 may not need to compare the other termination information for these terminations.

If the termination information for terminations T and TT matches (step 416), discovery process may reflect in database 212 that termination T is connected to termination TT on the condition that port P is determined to be connected to port PP (step 418). Discovery process may also record in database 212 identification information for terminations T and TT, for ports P and PP corresponding to these terminations, and for nodes N and NN that include these ports.

Discovery process 210 may next determine if port P includes any other unmatched terminations by, for example, querying database 212 (step 420). If port P does include other unmatched terminations (step 420), discovery process 210 may repeat the comparison method by selecting one of the unmatched terminations (step 406).

If port P does not include any other unmatched terminations (step 420), discovery process 210 may reflect in database 212 that port P is connected to port PP (step 422). Discovery process 210 may also record in database 212 identification information for ports P and PP and for nodes N and NN that include these ports.

Next, discovery process 210 may determine if node N includes any other unmatched ports (step 424). If node N does include other unmatched ports (step 424), then discovery process may repeat the comparison method by selecting one of the unmatched ports (step 404).

If node N does not include any other unmatched ports (step 424), then discovery process 210 may determine if network 104 includes any other nodes 106 with unmatched ports that have not been processed by discovery process 210 (step 426). If there are other nodes 106 with unmatched ports (step 426), discovery process 210 may repeat the comparison method by selecting one of these nodes 106 (step 402). On the other hand, if there are no other nodes 106 with unmatched ports (step 426), then discovery process 210 may terminate (step 428).

If discovery process 210 determines that the termination information for T and TT does not match (step 416), discovery process 210 may then determine if port PP includes any other unmatched terminations (step 430). If port PP does include other unmatched terminations (step 430), then discovery process 210 may choose one of those other unmatched terminations and repeat the comparison method (step 412).

Alternatively, if port PP does not include any other unmatched terminations (step 430), then discovery process 210 may determine if node NN includes any other unmatched ports (step 432). If node NN does include other unmatched ports (step 432), then discovery process 210 may select one of these other ports and repeat the comparison method (step 410).

If node NN does not include any other unmatched ports (step 432), then discovery process 210 may determine if network 104 includes any other nodes 106 with unmatched ports that have not been compared with the ports on node N (step 434). If there are such other nodes 106, discovery process 210 may choose one of these nodes 106 and repeat the comparison method (step 408).

On the other hand, if discovery process 210 determines that network 104 does not include any other nodes 106 with unmatched ports that have not been compared with ports on node N (step 434), discovery process 210 may then determine if network 104 includes any other nodes 106 with unmatched ports that have not been processed by discovery process 210 (step 426). If there are other nodes 106 with unmatched ports that have not been processed (step 426), discovery process 210 may repeat the comparison method by selecting one of these other nodes 106 (step 402). On the other hand, if there are no other nodes 106 with unmatched ports that have not been processed by discovery process 210 (step 426), then discovery process 210 may terminate (step 428).

If node 106 includes more than one network element, discovery process 210 may treat each network element as a node for determining connection information. Moreover, it will be apparent to one skilled in the art that various modifications may be made to the discovery process and comparison method shown in FIGS. 3 and 4. For example, the comparison method shown in FIG. 4 may be modified to determine connection information for only terminations in network 104. Similarly, the comparison method shown in FIG. 4 may be modified so that the number of terminations for a pair of ports is compared first. If the number of terminations do not match, then the termination information for the terminations on these two ports may not need to be compared.

An example will be provided now to illustrate how discovery process 210 may perform the comparison method shown in FIG. 4 to determine connection information for the terminations and ports on three nodes 106, N1, N2, and N3. Table 1 illustrates the number of ports and terminations on the three nodes 106. The column titled "Nodes" lists the three nodes, N1, N2, and N3, and the number of ports on each of these nodes; the column titled "Ports" lists the ports included in each of the nodes N1, N2, and N3; and the column titled "Terminations" lists the terminations included in each of the ports. Each of the ports and terminations has been assigned a label in this example. For example, port P1 on node N1 has been assigned the label "N1_P1" and the termination T1 on port P1 of node N1 has been assigned the label "N1_P1_T1."

TABLE 1

| Nodes | Ports | Terminations |
|---|---|---|
| N1 (with three ports) | N1_P1 | N1_P1_T1 |
| | N1_P2 | N1_P2_T1 |
| | | N1_P2_T2 |
| | N1_P3 | N1_P3_T1 |
| N2 (with two ports) | N2_P1 | N2_P1_T1 |
| | | N2_P1_T2 |
| | N2_P2 | N2_P2_T1 |
| N3 (with one port) | N3_P1 | N3_P1_T1 |

Moreover, the matches between the terminations are shown in Table 2. It is assumed that the termination information for the termination listed in the column titled "Termination 1" matches the termination information for the termination listed in the column titled "Termination 2."

TABLE 2

| Termination 1 | Termination 2 |
|---|---|
| N1_P1_T1 | N3_P1_T1 |
| N1_P2_T1 | N2_P1_T2 |
| N1_P2_T2 | N2_P1_T1 |
| N1_P3_T1 | N2_P2_T1 |

Table 3 illustrates the results of the steps shown in FIG. 4 as they are performed by discovery process 210 to determine connection information for the terminations and ports shown in Table 1. For example, when discovery process 210 begins to perform the comparison method, discovery process 210 may select a node N, select a port P on N, and a termination T on port P (steps 402, 404, and 406). The results of these steps are the selection of node N2, port N2_P2, and termination N2_P2_T1 and are shown in rows 2–4 of Table 3.

TABLE 3

| STEP | RESULT |
|---|---|
| 402 | Node N2 (Assuming discovery process 210 selects node N2) |
| 404 | Port N2_P2 (Assuming discovery process 210 selects port N2_P2) |
| 406 | Termination N2_P2_T1 |
| 408 | Node N3 (Assuming discovery process 210 selects node N3) |
| 410 | Port N3_P1 (Assuming discovery process 210 selects port N3_P1) |
| 412 | Termination N3_P1_T1 |
| 414 | Discovery process 210 compares termination information for terminations N2_P2_T1 & N3_P1_T1 |
| 416 | No match (based on Table 2) |
| 430 | No |
| 432 | No |
| 434 | Yes |

TABLE 3-continued

| STEP | RESULT |
|---|---|
| 408 | Node N1 |
| 410 | Port N1_P1 (Assuming discovery process 210 selects port N1_P1) |
| 412 | Node N1_P1_T1 |
| 414 | Discovery process 210 compares termination information for terminations N2_P2_T1 & N1_P1_T1 |
| 416 | No match (based on Table 2) |
| 430 | No |
| 432 | Yes |
| 410 | Port N1_P2 (Assuming discovery process 210 selects port N1_P2) |
| 412 | Termination N1_P2_T1 (Assuming discovery process 210 selects termination N1_P2_T1) |
| 414 | Discovery process 210 compares termination information for terminations N2_P2_T1 & N1_P2_T1 |
| 416 | No match (based on Table 2) |
| 430 | Yes |
| 412 | Termination N1_P2_T2 |
| 414 | Discovery process 210 compares termination information for terminations N2_P2_T1 & N1_P2_T2 |
| 416 | No match (based on Table 2) |
| 430 | No |
| 432 | Yes |
| 410 | Port N1_P3 (Assuming discovery process 210 selects port N1_P3) |
| 412 | Termination N1_P3_T1 |
| 414 | Discovery process 210 compares termination information for terminations N2_P2_T1 & N1_P3_T1 |
| 416 | Yes (based on Table 2) |
| 418 | Discovery process 210 reflects in database 212 that termination N2_P2_T1 is connected to termination N1_P3_T1 on the condition that port N2_P2 is determined to be connected to port N1_P3 |
| 420 | No |
| 422 | Discovery process reflects in database 212 that port N2_P2 is connected to port N1_P3. Discovery process may also record identification information for these ports and nodes that include these ports |
| 424 | Yes |
| 404 | Port N2_P1 |
| 406 | Termination N2_P1_T2 (Assuming discovery process 210 selects termination N2_P1_T2) |
| 408 | Node N1 (Assuming discovery process 210 selects node N1) |
| 410 | Port N1_P2 (Assuming discovery process 210 selects port N1_P2) |
| 412 | Termination N1_P2_T1 (Assuming discovery process 210 selects termination N1_P2_T1) |
| 414 | Discovery process compares termination information for terminations N2_P1_T2 and N1_P2_T1 |
| 416 | Yes (based on Table 2) |
| 418 | Discovery process 210 reflects in database 212 that termination N2_P2_T2 is connected to termination N1_P2_T1 on the condition that port N2_P2 is determined to be connected to port N1_P2 |
| 420 | Yes |
| 406 | Termination N2_P1_T1 |
| 408 | Node N1 (Assuming discovery process 210 selects node N1) |
| 410 | Port N1_P2 (Assuming discovery process 210 selects port N1_P2) |
| 412 | Termination N1_P2_T2 (Assuming discovery process 210 selects termination N1_P2_T1) |
| 414 | Discovery process compares termination information for terminations N2_P1_T1 and N1_P2_T2 |
| 416 | Yes (based on Table 2) |
| 418 | Discovery process 210 reflects in database 212 that termination N2_P1_T1 is connected to termination N1_P2_T2 on the condition that port N2_P1 is determined to be connected to port N1_P2 |
| 420 | No |
| 422 | Discovery process 210 reflects in database 212 that port N2_P1 is connected to port N1_P2. Discovery process may also record identification information for these ports and nodes that include these ports |
| 424 | No |
| 426 | Yes |
| 402 | Node N3 (Assuming discovery process 210 selects node N3) |
| 404 | Port N3_P1 |
| 406 | Termination N3_P1_T1 |
| 408 | Node N1 |
| 410 | Port N1_P1 |
| 412 | Termination N1_P1_T1 |
| 414 | Discovery process compares termination information for |

TABLE 3-continued

| STEP | RESULT |
|---|---|
| | terminations N3_P1_T1 and N1_P1_T1 |
| 416 | Yes (based on Table 2) |
| 418 | Discovery process 210 reflects in database 212 that termination N3_P1_T1 is connected to termination N1_P1_T1 on the condition that port N3_P1 is determined to be connected to port N1_P1 |
| 420 | No |
| 422 | Discovery process 210 reflects in database 212 that port N3_P1 is connected to port N1_P1. Discovery process may also record identification information for these ports and nodes that include these ports. |
| 424 | No |
| 426 | No |
| 428 | Discovery process 210 terminates |

The above-noted features, other aspects, and principles of the present invention may be implemented in various system or network configurations to provide automated and computational tools for determining connection information for ports in a network. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, it will be apparent to those skilled in the art that various modifications and variations can be made in the system and method of the present invention and in construction of this invention without departing from the scope or spirit of the invention.

Moreover, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining connection information for a first port and a second port in a network, the first port including a first set of terminations and the second port including a second set of terminations, the method comprising:

determining information about the first and second set of terminations comprising determining for the first and second set of terminations at least one of path label information, bandwidth information, and traffic information;

comparing the information about the first set of terminations with the information about the second set of terminations; and determining whether the first port is connected to the second port based on the comparison.

2. A method for determining connection information for a first and a second port in a network, the first port including a first set of terminations and the second port including a second set of terminations, the method comprising:

determining information about the first and second set of terminations comprising determining for the first and second set of terminations at least one of path label information, bandwidth information, and traffic description information;

comparing the information about the first set of terminations with information about the second set of terminations comprising at least one of the path label information, the bandwidth information, and the traffic description information for the first set of terminations with a respective one of the path label information, the bandwidth information, and the traffic description information for the second set of terminations; and determining whether the first port is connected to the second port based on the comparison.

* * * * *